(12) United States Patent
Sano et al.

(10) Patent No.: US 6,528,003 B1
(45) Date of Patent: Mar. 4, 2003

(54) MANUFACTURING APPARATUS AND METHOD FOR GOLF BALL

(75) Inventors: Hideki Sano, Kobe (JP); Takayuki Saimen, Kobe (JP); Hiromasa Yamamoto, Takarazuka (JP); Hiroaki Tanaka, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/482,868

(22) Filed: Jan. 14, 2000

(30) Foreign Application Priority Data

Feb. 8, 1999 (JP) .......................................... 11-029588
Mar. 12, 1999 (JP) .......................................... 11-066835

(51) Int. Cl.[7] .............................................. B65H 54/64
(52) U.S. Cl. ..................................... 264/310; 242/435.2
(58) Field of Search ........................... 242/435.2, 435.1; 264/310

(56) References Cited

U.S. PATENT DOCUMENTS 1,844,312 A * 2/1932 Cropper .................. 242/435.2
5,697,574 A * 12/1997 Miyakoshi et al. ......... 242/435.2
5,755,628 A * 5/1998 Kakiuchi et al. ........... 473/354

FOREIGN PATENT DOCUMENTS

JP          B22572802         10/1996

* cited by examiner

*Primary Examiner*—Jan H. Silbaugh
*Assistant Examiner*—Edmund H. Lee
(74) *Attorney, Agent, or Firm*—Birch, Stewart, Kolasch & Birch, LLP

(57) ABSTRACT

A core sphere or a wound-string core is held by a pair of bottom rollers and a pair of concave top rollers. Then, the bottom rollers are reciprocated in opposite directions respectively and rotated to rotate the core sphere or the wound-string core and wind rubber string, and a wound-string core of a predetermined diameter is obtained by pressurizing the core sphere or the wound-string core intermittently by the pair of top rollers with a predetermined pressure. Rotation frequency of the bottom roller is set to be 1100 rpm to 200 rpm, ratio of the rotation frequency of the bottom roller to number of the horizontal movement of the bottom roller is set to be 10:15 to 15:10, and ratio of pressurizing number of the top rollers to the number of the horizontal movement of the bottom roller is set to be 1:14 to 1:5.

6 Claims, 10 Drawing Sheets

MANUFACTURING APPARATUS AND METHOD FOR GOLF BALL

BACKGROUND OF THE INVENTION

1. Field of the Invention

This invention relates to a manufacturing apparatus and method for golf ball with which rubber string is wound on a core sphere to obtain a wound-string core.

2. Description of the Related Art

Conventionally, a wound-string golf ball is manufactured as that rubber string is wound on a core sphere composed of solid rubber or a core sphere formed by filling a rubber bag with liquid material of fluid or paste to form a wound-string core, and the wound-string core is coated with a cover.

As a method to wind the rubber string on this core sphere (so-called center), a method, in which the core sphere is held by plural winding rollers, at least one of the winding rollers is driven to rotate the core sphere and supply the rubber string onto the surface of the core sphere to wind the rubber string on the core sphere, is widely adopted. It is necessary to extend and wind the rubber string on the core sphere to improve hardness and resiliency of the core sphere. As a rubber string extending means, a means disclosed by Japanese Patent Publication No. 3-52312 is known.

In this rubber string extending means, provided with a pair of pre-supplying rollers, disposed on an upstream side of an upper winding roller and a lower winding roller holding the core sphere and winding the rubber string, and elastically pushed as to tightly contact each other, a main supplying roller supplying the rubber string to the upper and the lower winding rollers, and a guiding pulley attached to the main supplying roller, the rubber string going between the pair of pre-supplying rollers is hitched to the guiding pulley, and the rubber string is supplied to the core sphere held by the upper and lower winding rollers after the rubber string is led to go along a peripheral face of the main supplying roller to add tensile force.

On the other hand, as the winding roller, a winding apparatus of Japanese Patent No. 2572802 is known. That is to say, this winding apparatus, provided with a pair of cylindrical rollers arranged to be movable in an axis direction back and forth and rotatable, a concave roller, composed of a central roller portion and a pair of tapered roller portions rotatable independently on both sides of the central roller portion, disposed above the cylindrical rollers, and a control device, is constructed as to hold the core sphere with the pair of cylindrical rollers and the concave roller, and oscillate and rotate a spherical body (a core sphere or a wound-string core) to wind the rubber string at random by rotating with moving the cylindrical rollers back and forth.

In this case, to uniformly wind the rubber string on the spherical body, angular speed of the rotation of the spherical body is calculated from circumferential speed of the cylindrical roller and diameter of the spherical body, and reciprocation of the spherical body is controlled by the control device as angular speed of the oscillation of the spherical body is equal to that of the rotation of the spherical body. That is to say, even if the circumferential speed of the cylindrical roller is constant, the angular speed of the rotation of the spherical body is decreased along with increase of the diameter of the spherical body. So the reciprocation of the cylindrical roller is controlled to be short when the diameter of the spherical body is small and to be long when the diameter of the spherical body is long to control the oscillation of the spherical body. And, measurement of the diameter of the spherical body is conducted by detecting vertical displacement of the concave roller with a differential trans displacement gauge, and input of the detected value into the control device through an amplifier, a filter, an A/D converter, etc.

However, (the above-described) conventional rubber string extending means can not add stable tensile force (tension) to the rubber string because the pair of pre-supplying rollers, disposed on the upstream side of the main supplying roller, have point-contact with the rubber string, tension defects frequently occur (about 30%), and ununiform hardness of the rubber string layer wound on the core sphere and break of the rubber string are frequently generated thereby.

And, in the above-described winding apparatus of Japanese Patent No. 2572802, construction is extremely complicated and faults are easily caused, and cost is high for the expensive apparatus itself. And, talc, etc., to prevent the rubber strings from adhering each other, is scattered in the winding and tending to clog between the central roller portion and each of the tapered roller portions of the concave roller, and frequent maintenance is required.

SUMMARY OF THE INVENTION

It is therefore an object of the present invention to provide a manufacturing apparatus for golf ball having simple construction and hardly broken and a manufacturing method for golf ball, with which the problems above are solved, tension defect is improved, break of the rubber string is reduced, quality of the wound-string core is improved, and wound-string golf balls having good sphericity are mass-produced with low cost.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
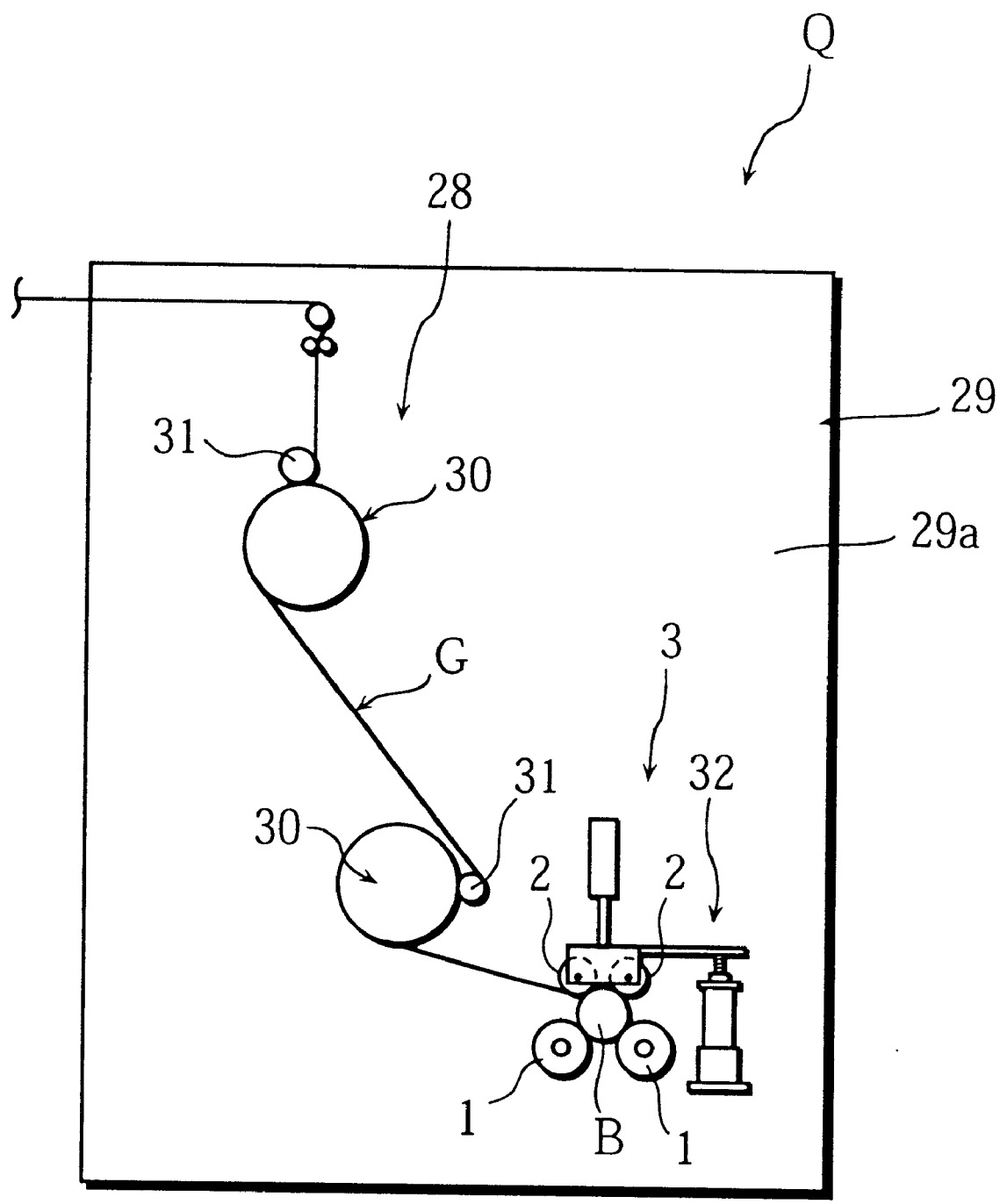
FIG. 1 is a front view showing a preferred embodiment of the present invention.

FIG. 1 shows a preferred embodiment of a manufacturing apparatus for golf ball of the present invention. This manufacturing apparatus for golf ball, for obtaining a wound-string core C by winding a rubber string G on a core sphere B, is provided with a winding means Q having a winding portion 3 winding the rubber string G on the core sphere B, and a rubber string extending portion 28 extending the rubber string G to send the rubber string G to the winding portion 3. 29 is a main body portion of the winding means Q. Top rollers 2 and bottom rollers 1 of the winding portion 3, tension rollers 30 and auxiliary rollers 31, etc., are disposed on a front wall 29a side of the main body portion 29. The core sphere B includes both of a core formed by filling a rubber bag with liquid material of fluid or paste (so-called liquid center) and a core made of solid rubber (so-called solid center).

As shown in FIG. 2 through FIG. 5, the winding portion 3 is provided with a pair of the bottom rollers 1 movable in a longitudinal axis S direction and rotatable around the axis S, a pair of the top rollers cooperating with the bottom rollers 1 to hold the core sphere B or the wound-string core C as to be rotatable and pressurize the core sphere B or the wound-string core C at a predetermined pressure intermittently, a reciprocating rotational driving mechanism 4 reciprocating the bottom rollers 1 in opposite directions each other and rotating the bottom rollers 1, and a top roller pressurizing mechanism 5 holding the pair of top rollers 2 as to freely rotate. And, the core sphere B or the wound-string core C may be mentioned later as a spherical body K.

Figure 2:
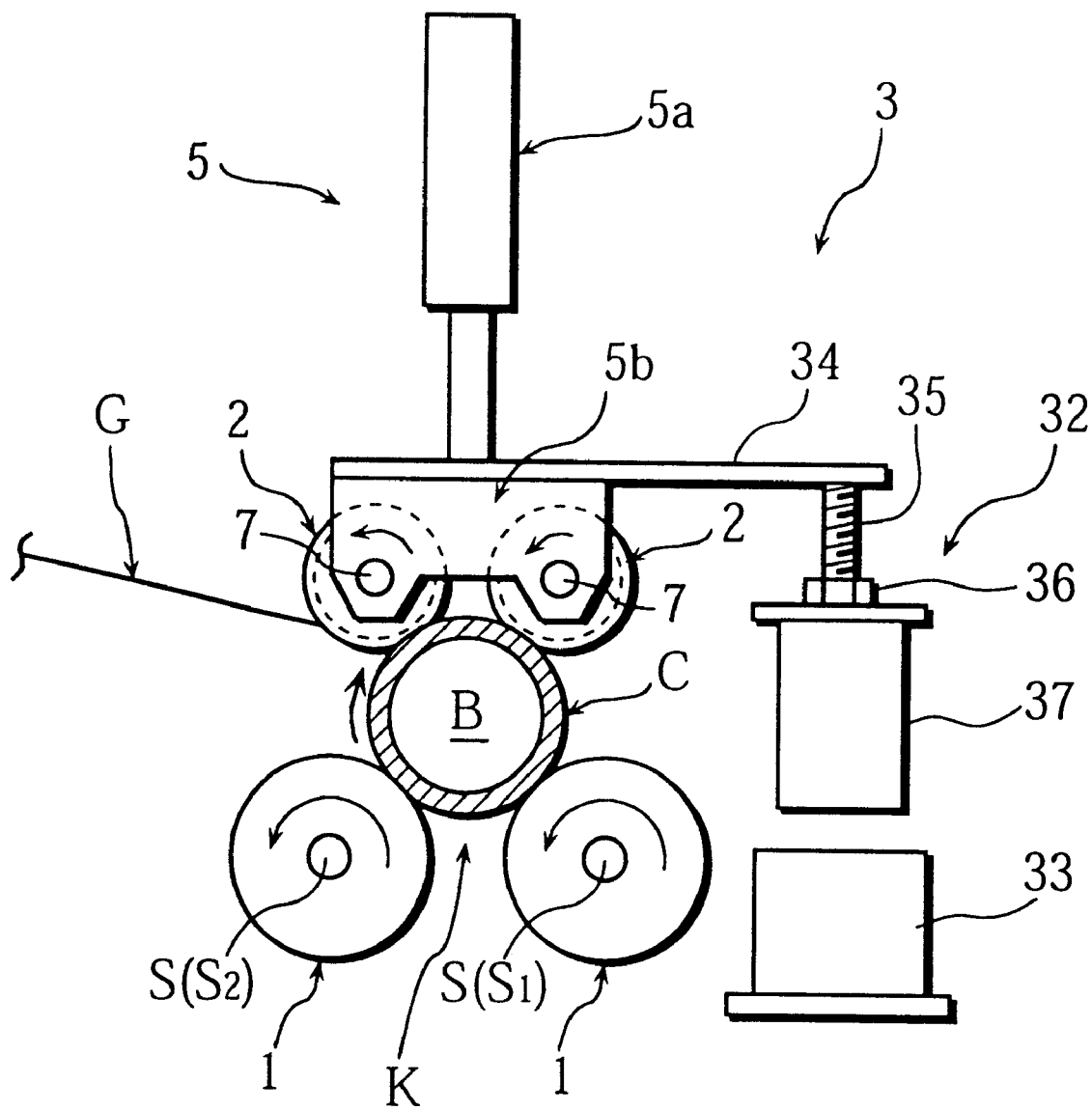
FIG. 2 is a front view showing a winding portion.
Figure 6:
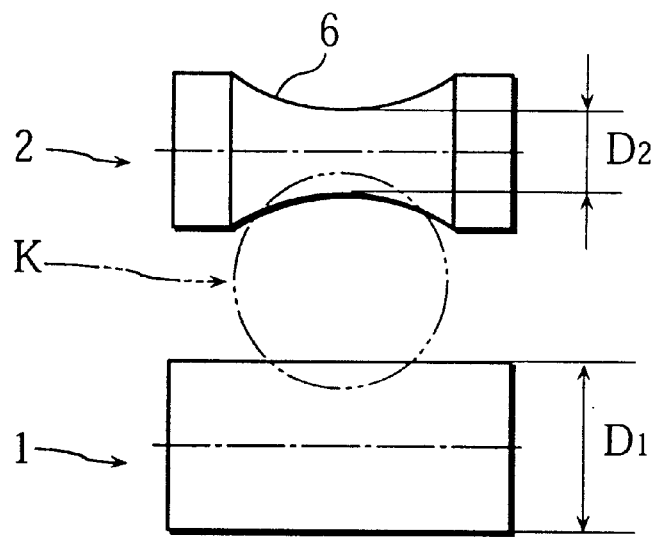
FIG. 6 is a side view showing a top roller and a bottom roller.

As shown in FIG. 2 and FIG. 6, the bottom roller 1 is cylindrical, and diameter dimension $D_1$ is set to be 34 mm to 42 mm. And, the top roller 2 is formed with a concave curved peripheral groove 6 on a central portion in axis direction, and minimum diameter dimension $D_2$ is set to be 15 mm to 35 mm. And, radius of curvature and width of the concave curved peripheral groove 6 are set as that the spherical body K held by the bottom rollers 1 and the top rollers 2 does not fall off.

And, the top roller pressurizing mechanism 5 has a cylinder portion 5a and an attachment portion 5b disposed on a lower end of an expansion rod of the cylinder portion 5a for attaching the pair of top rollers 2 through top roller shafts 7 as to freely rotate. And, the top rollers 2 are elevatable and able to press the spherical body K with a predetermined pressure for expansion and contraction of the cylinder portion 5a.

And, the winding portion 3 is provided with a pressure adjusting mechanism 32 for adjusting early pressure (pressing force) of the top rollers 2 and the bottom rollers 1 to the core sphere B. The pressure adjusting mechanism 32 is provided with a cradle portion 33 disposed near the bottom rollers 1, an attachment plate 34 connected to the attachment portion 5b on the lower end of the cylinder portion 5a, a male screw portion 35 vertically disposed on the attachment plate 34, a nut portion 36 screwing to the male screw portion 35, and a contact member 37 composed of elastic material (rubber, etc.) formed uniformly with the nut portion 36.

Figure 3:
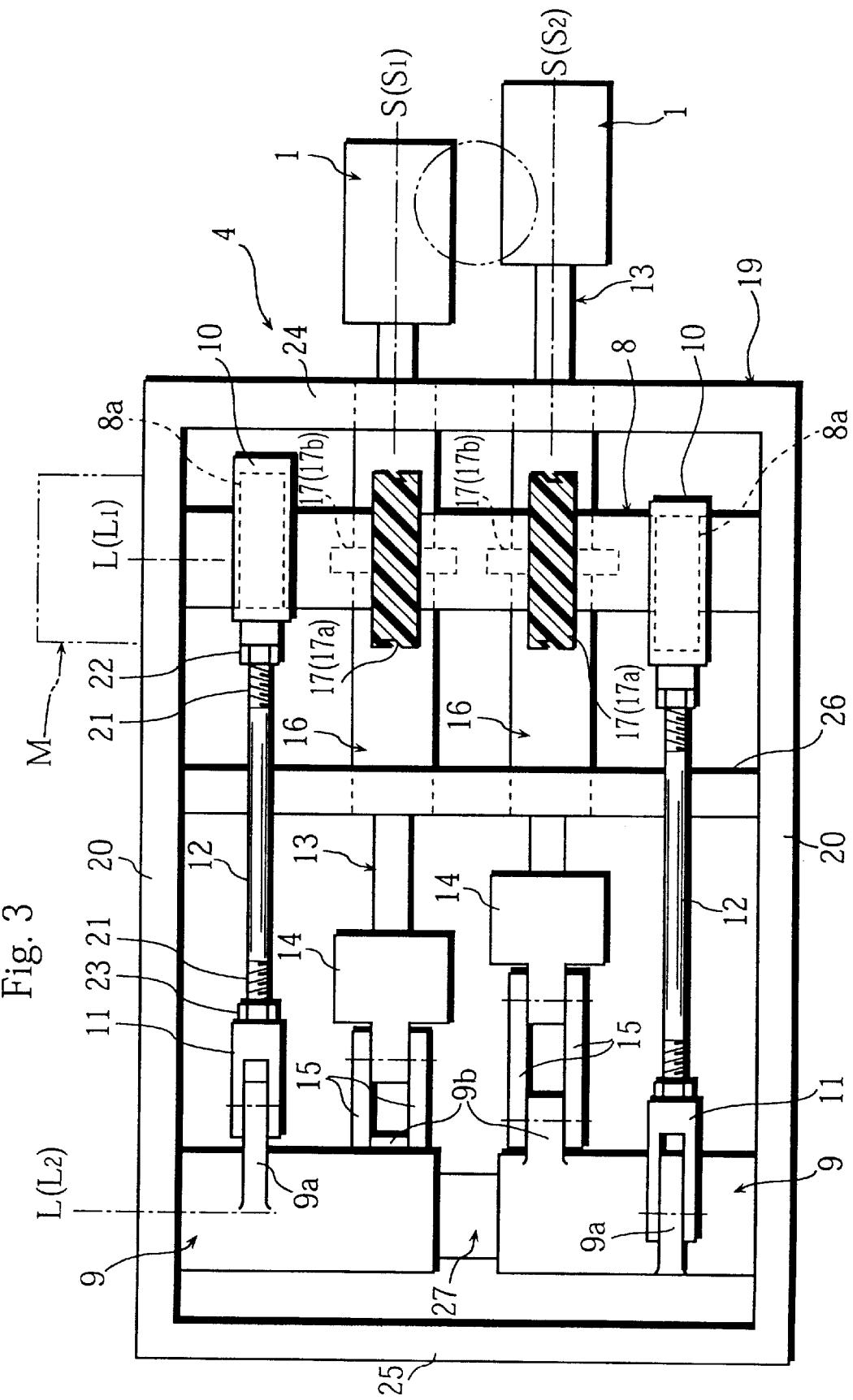
FIG. 3 is a first explanatory view showing a reciprocating rotational driving mechanism.
Figure 4:
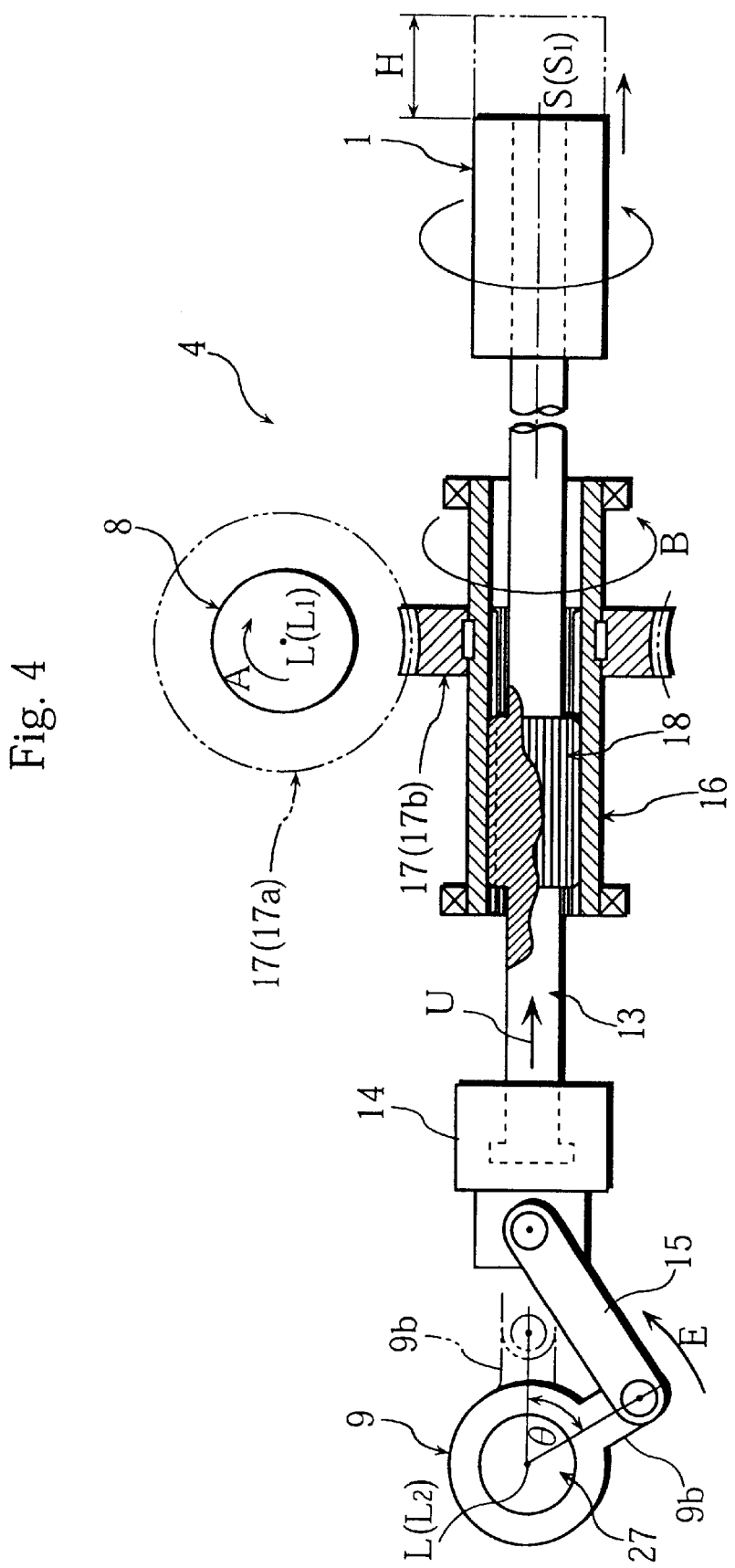
FIG. 4 is a second explanatory view showing the reciprocating rotational driving mechanism.
Figure 5:
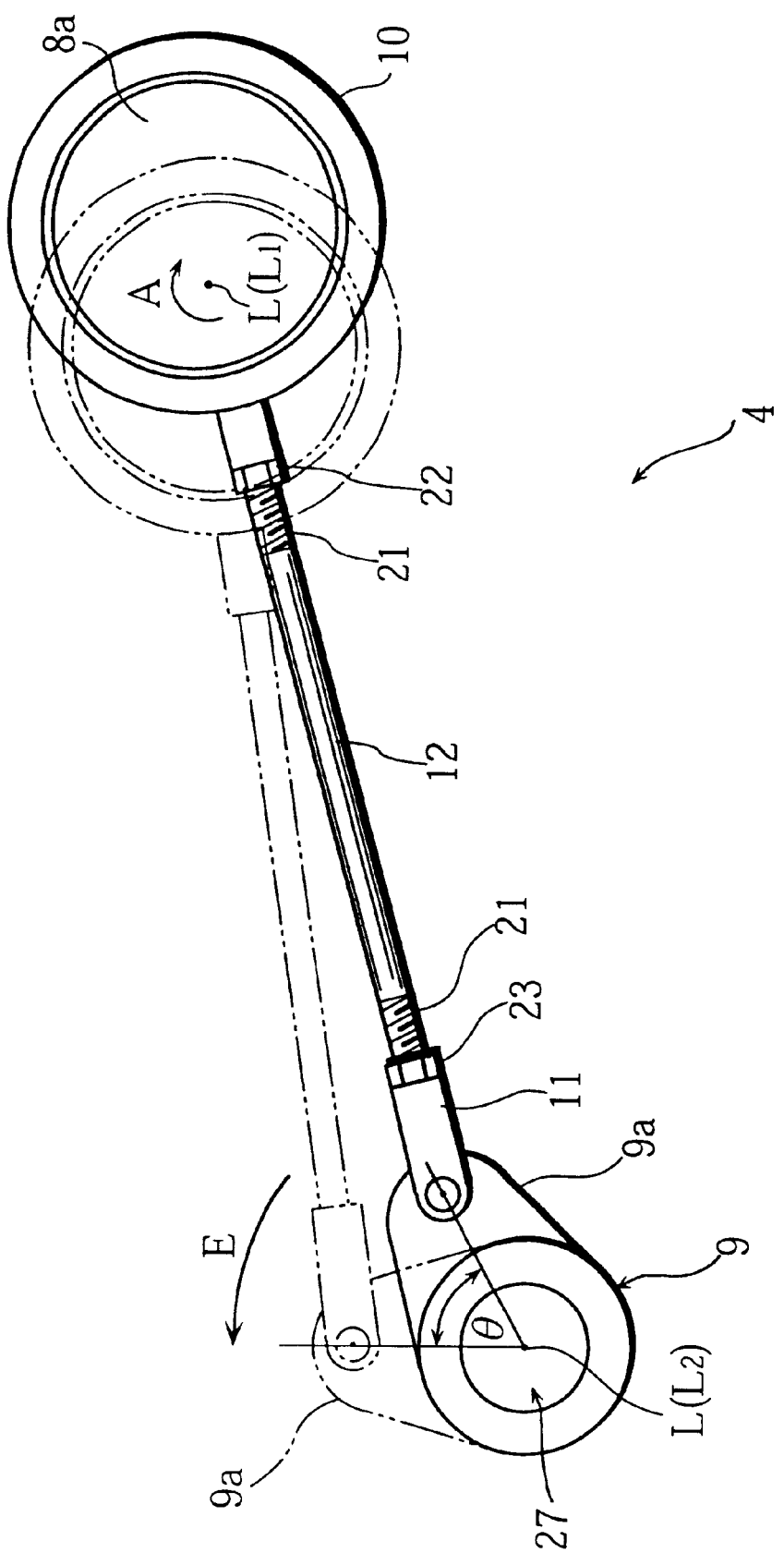
FIG. 5 is a third explanatory view showing the reciprocating rotational driving mechanism.

As shown in FIG. 3 through FIG. 5, the reciprocating rotational driving mechanism 4 is provided with an input shaft 8 having a pair of cam portions 8a and driven to rotate around a lateral axis L, turning shafts 9 disposed behind the input shaft 8 in the axis L direction, ring members 10 fitted to the cam portions 8a as to freely slide, attachment members 11 attached to first protruding pieces 9a on the turning shafts 9 as to freely oscillate, connecting members 12 connecting the ring members 10 to the attachment members 11, bottom roller shafts 13 of which front ends are connected to the bottom rollers 1 in the axis S direction, holding members 14 holding the other ends of the bottom roller shafts 13 as to freely rotate, crank members 15 of which front ends are attached to the holding members 14 and rear ends are attached to second protruding pieces 9b on the turning shafts 9, output shafts 16 outserted to the bottom roller shafts 13, plural gears 17 transmitting torque from the input shaft 8 to the output shafts 16, and rotational force transmitting mechanisms 18 transmitting the torque from the output shafts 16 allowing the bottom roller shafts 13 to move back and forth.

To describe concretely, 19 is a casing. The input shaft 8 is attached to left and right side walls 20 of the casing 19 as to freely rotate around the lateral axis $L_1$, and an attachment shaft 27 is attached to the left and right side walls 20 in the lateral axis $L_2$ direction parallel to the axis $L_1$. And, the pair of turning shafts 9 are fitted to the right and left side of the attachment shaft 27 as to freely turn. M is a motor which drives the input shaft 8 to rotate. And, each of the pair of cam portions 8a formed uniformly with the input shaft 8 on the left and right side of the input shaft 8 has a discoid configuration eccentric to the axis $L_1$, and one of the cam portions $8_a$ and the other of the cam portions 8a directed opposite to each other for 180°.

The ring member 10 has a nut portion 22 and the attachment member 11 has a nut portion 23 screw to male screw portions 21 each of which has opposite screw direction on the both ends of the connecting member 12. Length of the connecting member 12 is adjustable by screwing the male screw portions into and out of the nut portions 22 and 23, and oscillation angle θ of the first protruding piece 9a and the second protruding piece 9b of the turning shaft 9 can be adjusted thereby. This will be described later in detail.

And, a middle wall 26 is disposed between a front wall 24 and a rear wall 25 of the casing 19, and a pair of output shafts 26, each of which corresponds to one (on the axis $S_1$ side) and the other (on the axis $S_2$ side) of the bottom rollers 1 respectively, are attached to the front wall 24 and the middle wall 26 parallel to each other as to freely rotate.

Two of the gears 17 are on the input shaft 8 as to be rotatable uniformly with the input shaft 8, and one of the gears 17 is on each of the output shafts 16 as to be rotatable uniformly with the output shaft 16. Concretely, the gears 17 on the input shaft 8 are worms 17a, the gears 17 on the output shafts 16 are worm wheels 17b, and each of the worms 17a and each of the worm wheels 17b engage each other. And, as the above-described rotational force transmitting mechanism 18, for example, a spline disposed between the output shaft 16 and the bottom roller shaft 13 is used.

Next, manufacturing method for golf ball of the present invention is briefly described with reference to FIG. 2 through FIG. 7. The core sphere B or the wound-string core C is held by the pair of bottom rollers 1 and the pair of top rollers 2 of the winding portion 3 described above, the pair of bottom rollers 1 are advanced and retreated in opposite directions each other in the longitudinal axis S ($S_1$, $S_2$) direction and rotated to rotate the core sphere B or the wound-string core C and wind the rubber string G, and the core sphere B or the wound-string core C is pressurized by the pair of top rollers 2 intermittently with a predetermined pressure to obtain the wound string core C of a predetermined diameter dimension.

To describe the working of the winding portion 3 in winding process concretely, FIG. 3 shows a state in which the bottom roller 1 of one side (the axis $S_1$ side) is at retreated position and the bottom roller 1 of the other side (the axis $S_2$ side) is at advanced position. Then, as shown in FIG. 3 and FIG. 4, the motor M drives to rotate the input shaft 8 (in an arrow A direction), torque around the axis $L_1$ is converted torque around the axes $S_1$ and $S_2$ through the worms 17a and the worm wheels 17b to rotate the pair of output shafts 16 (in an arrow B direction).

On the other hand, the input shaft 8 rotates and the cam portion 8a rotates for 180° (in the arrow A direction), the ring member 10 moves backward sliding on a peripheral face of the cam portion 8a as shown with an imaginary line in FIG. 5, and the first protruding piece 9a of the turning shaft 9 oscillates for a predetermined oscillation angle θ (in an arrow E direction) thereby. That is to say, as shown in FIG. 4, the second protruding piece 9b of the turning shaft 9 oscillates for the predetermined oscillation angle θ (in the arrow E direction). And, the crank members 15 push the bottom roller shaft 13 forward (in an arrow U direction) through the holding member 14 thereby.

By this working, the bottom roller shaft 13 rotates and advances because the torque from the output shaft 16 is transmitted to the bottom roller shaft 13 (as described above) through the rotational force transmitting mechanism 18 (spline). That is to say, the bottom roller 1 rotates and advances. Then, the cam portion 8a rotates for 360°, the turning shaft 9 oscillates to the initial position, the bottom roller shaft 13 is drawn backward through the crank members 15 and the holding member 14, and the bottom roller 1 rotates and retreats. As described above, the moving direction of the advancing and retreating bottom roller 1 is switched for every 180° of the rotation of the cam portion 8a.

While one reciprocating movement of the bottom roller 1 on one side (the axis $S_1$ side) is described above, the bottom roller 1 on the other side (the axis $S_2$ side) reciprocates in opposite directions to that of the axis $S_1$ side. Directions of the rotation of each of the bottom rollers are same. And, horizontal movement dimension H of one stroke of the bottom roller 1 is adjusted by the oscillation angle θ of the first and second protruding pieces 9a and 9b of the turning shaft 9, and the oscillation angle θ is adjusted by adjusting the length of the connecting member 12 (as described above).

Figure 7:
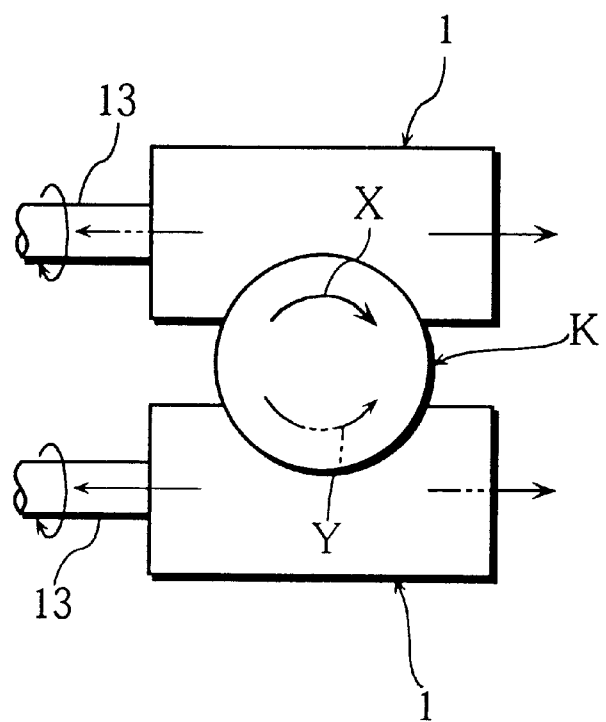
FIG. 7 is an explanatory view showing oscillation of a wound-string core in winding process.

As described above, the pair of bottom rollers 1 advance and retreat in opposite directions each other and rotate, the spherical body K (the core sphere B or the wound-string core C) oscillates (turns) as shown with arrows X and Y in a plane view and rotates as shown in FIG. 2 and FIG. 7, and the rubber string G is wound on the spherical body K with changing winding position. That is to say, random winding is conducted.

However, actually it is difficult to achieve sphericity with which function as a golf ball is fulfilled only with this working. So conditions described below are set. That is to say, in the winding process, in which the spherical body K is intermittently pressurized by the pair of top rollers 2 with the predetermined pressure, ratio of the number of pressurization to the number of reciprocation (one set of advancing and retreating is counted as one) of the bottom roller 1 is set to be a predetermined ratio within a range of 1:14 to 1:5. That is to say, the top roller pressurizing mechanism 5 is controlled as to pressurize with the predetermined pressure and the above ratio (1:14 to 1:5). The oscillation of the spherical body K becomes very smooth and the sphericity is improved thereby. It is preferable to gradually increase and decrease the pressure by the top rollers 2 to the predetermined pressure instead of rapid pressurization.

Further, (as described with FIG. 6) the diameter dimension $D_1$ of the bottom roller 1 (mentioned as bottom roller diameter below) is set to be 34 mm to 42 mm, the minimum diameter dimension $D_2$ of the central portion in axis direction of the top roller 2 (mentioned as top roller diameter below) is set to be 15 mm to 35 mm, rotation frequency of the bottom roller 1 is set to be a predetermined rotation frequency within a range of 1100 rpm to 2000 rpm, and ratio of number of rotation of the bottom roller 1 to number of reciprocation of the bottom roller 1 is set to be a predetermined ratio within a range of 10:15 to 15:10.

That is, the rotation frequency of the spherical body K decreases as the winding proceeds, and the diameter of the spherical body K increases because the rotation speed (rotation frequency) of the bottom roller is constant. In addition, the number of oscillations for one rotation increases in the spherical body K as rotation frequency is decreased, because the reciprocation frequency of the bottom roller is also constant. Also, when the rotation frequency of the spherical body K decreases, the frequency of pressurization virtually increases because the frequency of pressurization of the top roller is also constant. According to the present invention, a wound-string core having very good sphericity can be obtained that is not influenced by increases in the diameter of the spherical body K given the above conditions.

Therefore, when the above conditions deviate from the above ranges, problems described below are generated.

① If the bottom roller diameter is less than 34 mm, area which contacts the spherical body K decreases, the spherical body K can not oscillate smoothly, and the spherical body K is rapidly abraded by increased total number of rotation. And, if the bottom roller diameter is more than 42 mm, smooth oscillation is difficult for rotation of the spherical body K just after the start of winding is excessive. In this case, the rubber string G is broken when the reciprocation movement speed or frequency of pressurization of the top roller is increased.

② If the top roller diameter is less than 15 mm, the area which contacts the spherical body K decreases, the spherical body K can not oscillate smoothly, and the spherical body K is rapidly abraded by increased total number of rotations. Also, if the top roller diameter is more than 35 mm, the axes of the top rollers have to be apart from each other, the holding direction of the spherical body K in winding is inclined, force from the top roller pressurizing mechanism 5 can not be transmitted accurately, osciallation of the spherical body K does not work well so that winding becomes nonuniform, and the sphericity becomes worse thereby.

③ If the rotation frequency of the bottom roller 1 is less than 1100 rpm, working efficiency is bad for long winding time and industrial practice is difficult. And, if the rotation frequency is more than 2000 rpm, the spherical body K does not oscillate smoothly, the sphericity becomes worse, break of the rubber string frequently occurs, and the spherical body K is rapidly abraded. And, slip is frequently generated between the rubber string G and the bottom rollers 1 and stable tension is hardly given.

④ If the ratio of the number of rotation of the bottom roller 1 to the number of reciprocation of the bottom roller 1 is less than 10:15 (ratio of the number of rotation decreases), the spherical body K oscillates excessively and the sphericity becomes bad. And, if the ratio is more than 15:10 (ratio of the number of rotation increases), the oscillation of the spherical body K becomes insufficient and the sphericity becomes bad.

⑤ If the ratio of the number of pressurizations by the top rollers 2 to the number of reciprocations of the bottom rollers 1 is less than 1:14 (ratio of the number of pressurizations is low), the spherical body K is insufficiently pressed to the bottom rollers 1, and oscillation of the spherical body K is insufficient, negatively affecting sphericity. Also, if the ratio is more than 1:5 (ratio of the number of pressurizations is high), the spherical body K is excessively pressed to the bottom rollers 1 and excessively oscillated, adversely affecting sphericity.

And, although making the rotation frequency of the bottom roller and the frequency of the pressurization of the top roller changeable may be a countermeasure for the problems ① through ⑤ described above, this makes the apparatus large and complicated, and causes high cost. These are difficulties in practice of industrial scale.

The present invention is not restricted to the embodiments described above. For example, a bearing may be disposed on an inner peripheral side of the ring member 10 such that the cam portion 8a of the input shaft 8 slides on the bearing to reduce frictional resistance with the ring member 10 and smoothly rotate.

Figure 8:
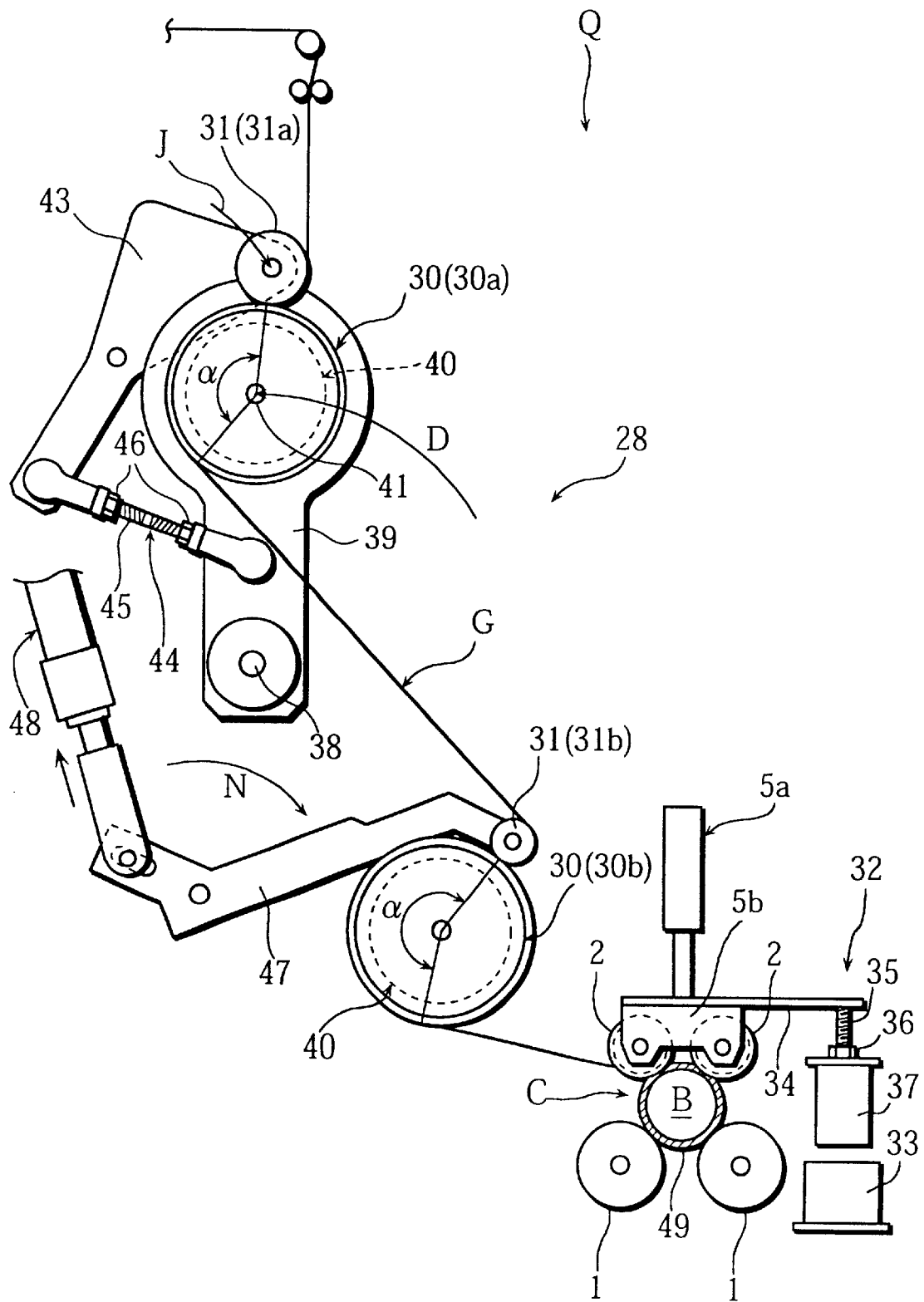
FIG. 8 is a front view of a principal portion showing a state that tension is added to rubber string by a rubber string extending portion.
Figure 9:
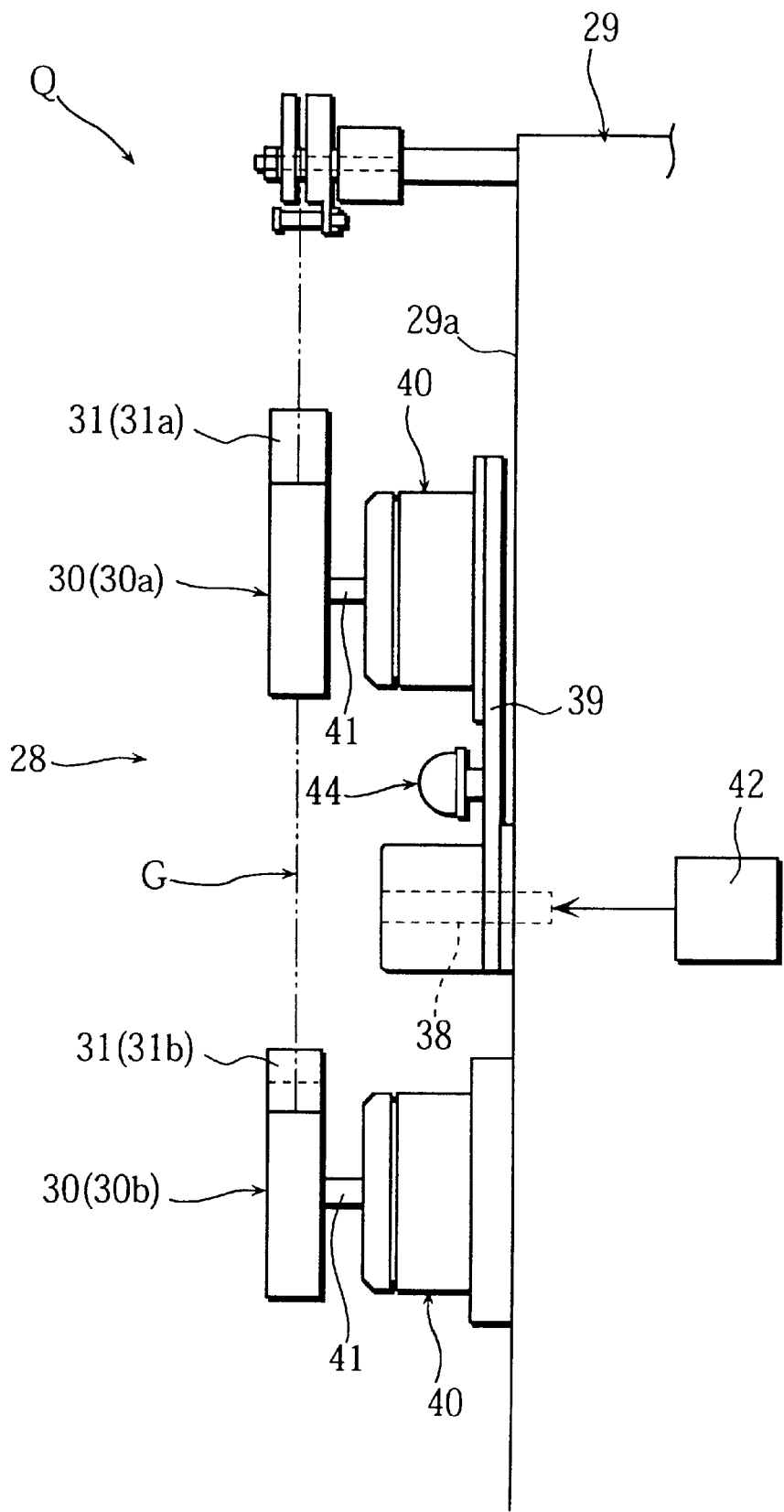
FIG. 9 is a side view of a principal portion showing an attachment portion of a tension roller.
Figure 10:
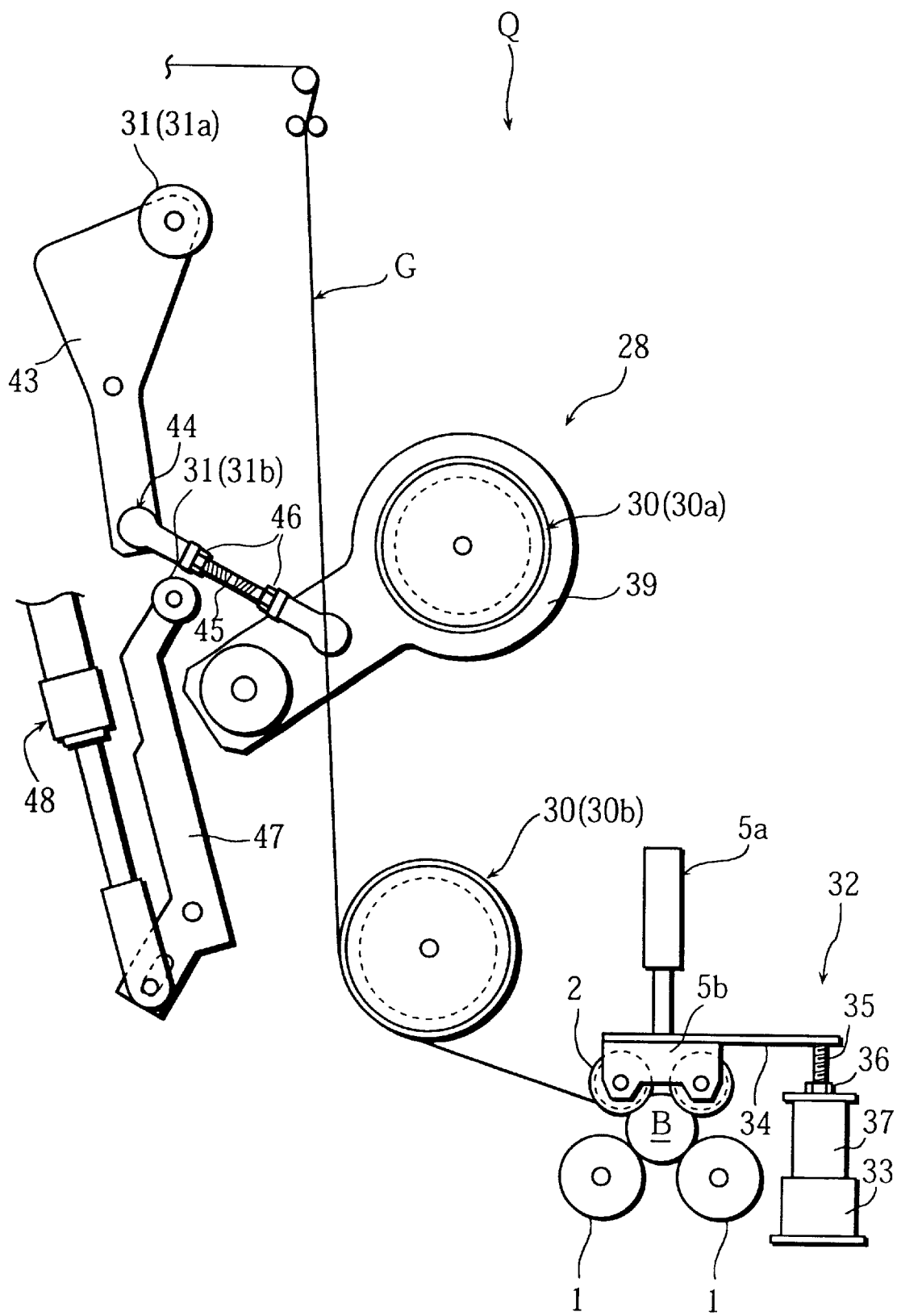
FIG. 10 is a front view of a principal portion showing a state before adding tension to the rubber string.

Next, FIG. 1, FIG. 8, and FIG. 9 show winding process of the rubber string. And FIG. 10 shows a state before the winding. The rubber string extending portion 28 is concretely described with reference to FIG. 1 and FIGS. 8 through 10. The rubber string extending portion 28 is provided with upper and lower tension rollers 30 adding tension to the rubber string G, and auxiliary rollers 31 pressing the rubber string G to the tension rollers 30 respectively.

The upper tension roller 30 (30a) is attached to an upper end of a first attachment plate 39, attached to the front wall 29a of the main body portion 29 through a connecting shaft 38 as to be oscillatable, through a braking means 40 as to be rotatable. In detail, a hysteresis brake is disposed on the upper end of the first attachment plate 39, the upper tension roller 30a is attached to a braking shaft 41, and electrically controlled braking force is added to the upper tension roller 30a by the hysteresis brake. 42 is a driving portion (a motor, for example) which turns the connecting shaft 38 to oscillate the first attachment plate 39.

And, (as shown in FIG. 10) the upper auxiliary roller 31 (31a) is attached to an upper end of a second attachment plate 43, attached to the front wall 29a as to be oscillatable, as to freely rotate on an opposite side of the upper tension roller 30a with respect to the rubber string G. Further, both sides of a connecting member 44 are respectively connected to the first attachment plate 39 and the second attachment plate 43 as to be oscillatable. When the driving portion 42 drives the first attachment plate 39 to oscillate to the rubber string G side, the second attachment plate 43 oscillates to the rubber string G side synchronizing with the first attachment plate 39.

That is to say, the upper tension roller 30a and the upper auxiliary roller 31a are respectively moved to the rubber string G side (in an arrow D direction and an arrow J direction), the rubber string G is pressed to a peripheral face of the upper tension roller 30a by the upper auxiliary roller 31a, and the rubber string G goes along the peripheral face of the upper tension roller 30a.

The connecting member 44 is composed of a shaft 45 having right-handed screw and left-handed screw at the both ends, and nut portions 46 screwing to the right-handed screw and the left-handed screw of the shaft 45 and respectively attached to the first attachment plate 39 and the second attachment plate 43. The position, where the rubber string G is pressed to the peripheral face of the upper tension roller 30a by the upper auxiliary roller 31a, is changeable with length adjustment in which the nut portions 46 are closed to and parted from each other by rotating the shaft 45. This will be described later in detail.

And, another hysteresis brake (braking means 40) is fixed to the front wall 29a of the main body portion 29 below the upper tension roller 30a, and the lower tension roller 30 (30b) is attached to a braking shaft 41. Further, (as shown in FIG. 10) the lower auxiliary roller 31 (31b) is attached to an end of an oscillating arm 47, attached to the front wall 29a as to be oscillatable, as to freely rotate on an opposite side of the lower tension roller 30b with respect to the rubber string G.

48 is a cylinder to oscillate the oscillating arm 47 to the rubber string G side. The lower auxiliary roller 31 is oscillated to the rubber string G side (in an arrow N direction) along with the oscillating arm 47 by extension of the cylinder 48. That is to say, the rubber string G is pressed to a peripheral face of the lower tension roller 30b by the moved lower auxiliary roller 31b, and the rubber string G goes along the peripheral face of the lower tension roller 30b. And, the top rollers 2 and the bottom rollers 1 (described above) are disposed near the lower tension roller 30b.

Therefore, in pre-winding state of the rubber string G, as shown in FIG. 10, an end of the rubber string G sent from a rubber supplying portion (not shown in Figures) is attached to the core sphere B, and the core sphere B is held by the top rollers 2 and the bottom rollers 1 together with the rubber string G. In this case, pressing force of the top rollers 2 is regulated by that the contact member 37 of the pressure adjusting mechanism 32 contacts the cradle portion 33, and the core sphere B is softly held by the top rollers 2 and the bottom rollers 1.

Figure 11:
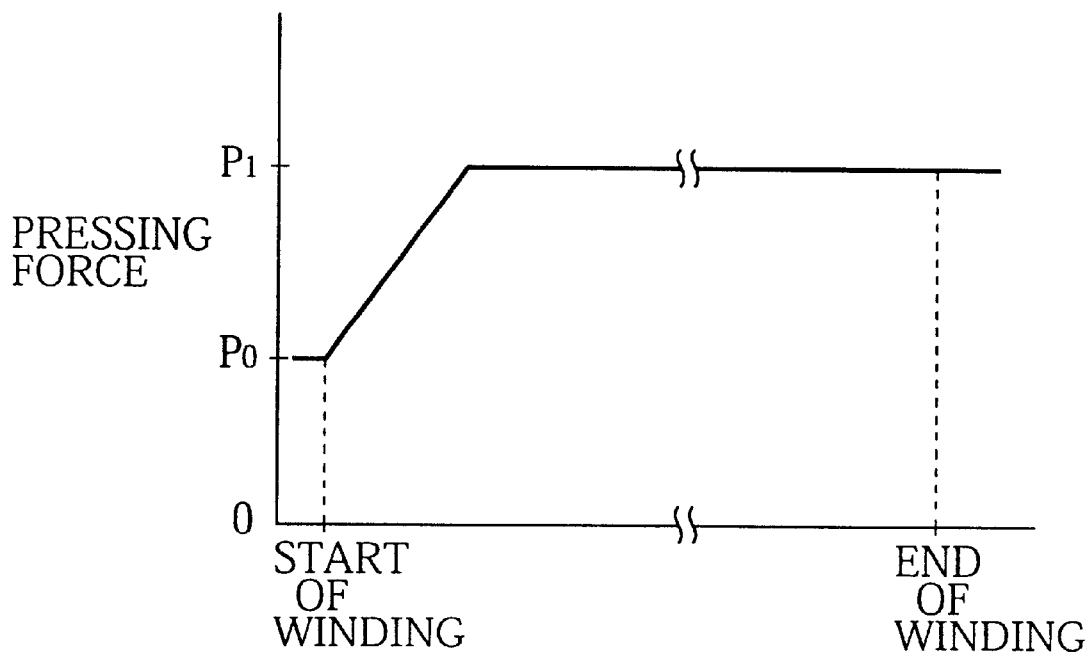
FIG. 11 is a graph showing change of pressing force of the winding roller in the winding process.

That is to say, in case of a solid center, although the solid center tends to be elastically deformed in an early stage of winding because the solid center is directly pressed by the top rollers 2 and the bottom rollers 1, this problem is solved by arranging initial pressure $P_0$, with which the core sphere B is pressed by the top rollers 2 and the bottom rollers 1 at the start of the winding, lower than pressing force $P_1$ in normal winding using the pressure adjusting mechanism 32 as shown in FIG. 10 and FIG. 11. According to the pressure adjusting mechanism 32, the pressing force can be easily adjusted by that the nut portion 36 is screwed to and out of the male screw portion 35 by turning the contact member 37.

After the core sphere B is set between the top rollers 2 and the bottom rollers 1 with the rubber string G, as described with FIG. 8, the upper tension roller 30a and the upper auxiliary roller 31a are moved as to come close to each other, the lower auxiliary roller 31b is moved to the lower tension roller 30b side, and tension is added to the rubber string G with the upper and lower tension rollers 30a and 30b on an upstream side of the top rollers 2 and the bottom rollers 1 thereby.

In this case, the rubber string G is led along the peripheral surface of the upper tension roller 30a by a pair of the upper tension roller 30a and the upper auxiliary roller 31a and a pair of the lower tension roller 30b and the lower auxiliary roller 31b with a central angle α of 90° to 300°, and the rubber string G is led along the peripheral surface of the lower tension roller 30b by the pair of the lower tension roller 30b and the lower auxiliary roller 31b and a pair of the top rollers 2 and the bottom rollers 1 with a central angle α of 90° to 300°. If the central angle α is less than 90°, it is difficult to add desired tension because the each tension roller 30 tends to slip on the rubber string G. And, the central angle α more than 300° is excessive, and mechanical structure of the winding means becomes complicated.

As described above, the position, where the rubber string G is pressed to the peripheral face of the upper tension roller 30a by the upper auxiliary roller 31a, is changeable with length adjustment of the connecting member 44, and the central angle α of a range for which the rubber string G goes along the peripheral surface of the tension rollers.

Then, the extended rubber string G is wound on the core sphere B held and rotated by the top rollers 2 and the bottom rollers 1. In this case, braking force of at least one of the tension rollers 30 is set to monotonously increase from 0 to a predetermined value within a short time span from the start of the winding.

Figure 12:
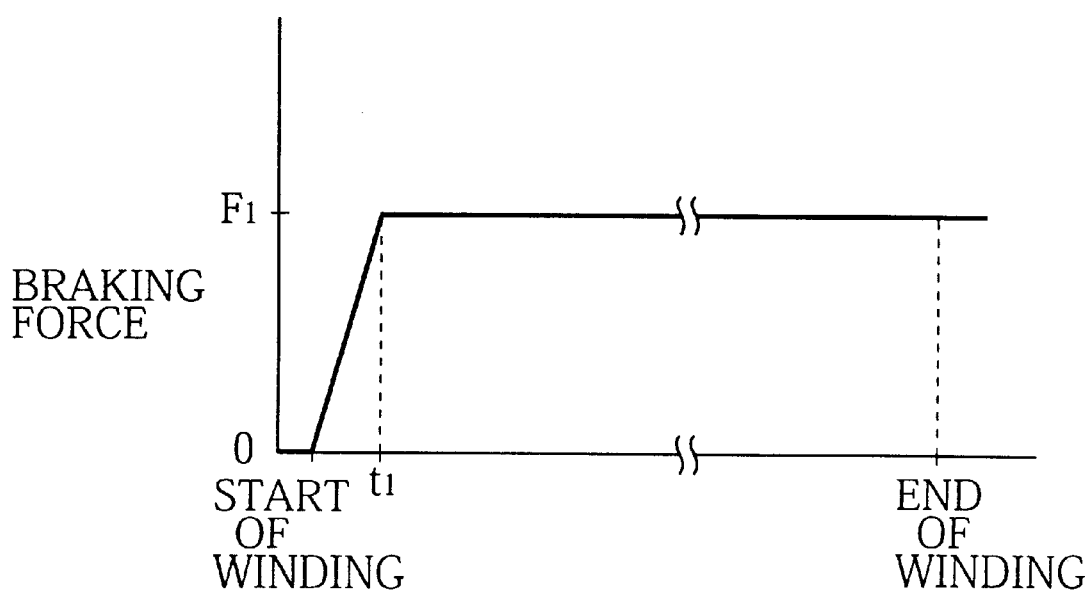
FIG. 12 is a graph showing change of braking force of the tension roller in the winding process.

To describe concretely, as shown in FIG. 8 and FIG. 12, braking force of the lower tension roller 30b is set to monotonously increase from 0 to a predetermined value $F_1$ within a short time span $t_1$ from the start of the winding of the rubber string G. Preferably, the braking force is set to straightly reach for the predetermined value $F_1$ 2 to 5 seconds after the start of the winding. That is to say, the braking force is gradually increased by controlling electric current value of the braking means 40 (hysteresis brake) to prevent abrupt tension from working on the rubber string G when the winding starts, and break of the rubber string is greatly reduced thereby.

On the other hand, while the braking force of the upper tension roller 30a, may be set to monotonously increase from 0 to a predetermined value within a short time span from the start of the winding same as the lower tension roller 30b, is normally constant from the start of the winding.

And, ratio of the braking force of the upper tension roller 30a to the braking force of the lower tension roller 30b is preferably 3:10 to 9:10. If the braking force of the upper tension roller 30a is larger than or smaller than this range, it is difficult to add stable tension to the rubber string, and problems such as dispersion of hardness of wound rubber string layer 49 and disarrangement of winding form are generated.

As described above, the extended and tension-added rubber string G is wound on the core sphere B to form the wound-string core C. When the thickness of the rubber string layer 49 increases and the wound-string core C reaches for a predetermined diameter, as shown in FIG. 8 and FIG. 11, the contact member 37 of the pressure adjusting mechanism 32 parts from the cradle portion 33, and the top rollers 2 and the bottom rollers 1 press and hold the wound-string core C with the normal pressing force $P_1$ (as described above).

In the present invention, not restricted to the embodiments described above, for example, while a case that two tension rollers 30 add tension to the rubber string G is shown in the embodiment above, the tension rollers 30 may be three or more.

EXAMPLES

Next, wound-string cores as examples 1 through 24 are made with the manufacturing apparatus and method for golf ball relating to the present invention. And, wound-string cores as comparison examples 1 through 18 are also made. And, sphericity is measured on each wound-string core of the examples 1 through 24 and the comparison examples 1 through 18, and the results are shown in Table 1 and Table 2.

TABLE 1

| EXAMPLE | TOP ROLLER DIAMETER (mm) | BOTTOM ROLLER DIAMETER (mm) | ROTATION NUMBER OF BOTTOM ROLLER (rpm) | RATIO OF ROTATION NUMBER TO RECIPROCATION NUMBER OF BOTTOM ROLLER | RATIO OF PRESSURIZATION NUMBER OF TOP ROLLER TO RECIPROCATION NUMBER OF BOTTOM ROLLER | SPHERICITY (percentage of the minimum diameter to the maximum diameter of wound-string core) |
|---|---|---|---|---|---|---|
| 1 | 15 | 35 | 1510 | 1:1 | 1:10 | 98 |
| 2 | 15 | 39 | 1510 | 1:1 | 1:10 | 99 |
| 3 | 21 | 35 | 1510 | 1:1 | 1:10 | 98 |
| 4 | 21 | 39 | 1510 | 1:1 | 1:10 | 99 |
| 5 | 35 | 35 | 1510 | 1:1 | 1:10 | 98 |
| 6 | 35 | 39 | 1510 | 1:1 | 1:10 | 99 |
| 7 | 21 | 34 | 1510 | 1:1 | 1:10 | 97 |
| 8 | 21 | 42 | 1510 | 1:1 | 1:10 | 97 |
| 9 | 21 | 35 | 1150 | 1:1 | 1:10 | 97 |
| 10 | 21 | 39 | 1150 | 1:1 | 1:10 | 97 |
| 11 | 21 | 35 | 1950 | 1:1 | 1:10 | 97 |
| 12 | 21 | 39 | 1950 | 1:1 | 1:10 | 97 |
| 13 | 21 | 35 | 1510 | 10:15 | 1:10 | 97 |
| 14 | 21 | 39 | 1510 | 10:15 | 1:10 | 97 |
| 15 | 21 | 35 | 1510 | 13:15 | 1:10 | 98 |
| 16 | 21 | 39 | 1510 | 13:15 | 1:10 | 99 |
| 17 | 21 | 35 | 1510 | 15:13 | 1:10 | 98 |
| 18 | 21 | 39 | 1510 | 15:13 | 1:10 | 98 |
| 19 | 21 | 35 | 1510 | 15:10 | 1:10 | 97 |
| 20 | 21 | 39 | 1510 | 15:10 | 1:10 | 97 |
| 21 | 21 | 35 | 1510 | 1:1 | 1:5 | 97 |
| 22 | 21 | 39 | 1510 | 1:1 | 1:5 | 97 |
| 23 | 21 | 35 | 1510 | 1:1 | 1:14 | 97 |
| 24 | 21 | 39 | 1510 | 1:1 | 1:14 | 97 |

TABLE 2

| COMPARISON EXAMPLE | TOP ROLLER DIAMETER (mm) | BOTTOM ROLLER DIAMETER (mm) | ROTATION NUMBER OF BOTTOM ROLLER (rpm) | RATIO OF ROTATION NUMBER TO RECIPROCATION NUMBER OF BOTTOM ROLLER | RATIO OF PRESSURIZATION NUMBER OF TOP ROLLER TO RECIPROCATION NUMBER OF BOTTOM ROLLER | SPHERICITY (percentage of the minimum diameter to the maximum diameter of wound-string core) |
|---|---|---|---|---|---|---|
| 1 | 12 | 35 | 1510 | 1:1 | 1:10 | 90 |
| 2 | 12 | 39 | 1510 | 1:1 | 1:10 | 92 |
| 3 | 37 | 35 | 1510 | 1:1 | 1:10 | 93 |
| 4 | 37 | 39 | 1510 | 1:1 | 1:10 | 92 |
| 5 | 21 | 32 | 1510 | 1:1 | 1:10 | 92 |
| 6 | 21 | 44 | 1510 | 1:1 | 1:10 | 91 |
| 7 | 21 | 35 | 1050 | 1:1 | 1:10 | 91 |
| 8 | 21 | 39 | 1050 | 1:1 | 1:10 | 92 |
| 9 | 21 | 35 | 2050 | 1:1 | 1:10 | 90 |
| 10 | 21 | 39 | 2050 | 1:1 | 1:10 | 91 |
| 11 | 21 | 35 | 1510 | 10:17 | 1:10 | 92 |
| 12 | 21 | 39 | 1510 | 10:17 | 1:10 | 92 |
| 13 | 21 | 35 | 1510 | 17:10 | 1:10 | 92 |
| 14 | 21 | 39 | 1510 | 17:10 | 1:10 | 91 |
| 15 | 21 | 35 | 1510 | 1:1 | 1:4 | 92 |
| 16 | 21 | 39 | 1510 | 1:1 | 1:4 | 91 |
| 17 | 21 | 35 | 1510 | 1:1 | 1:15 | 90 |
| 18 | 21 | 39 | 1510 | 1:1 | 1:15 | 91 |

The sphericity of the wound-string core has to be at least 95% for quality of the golf ball, and preferably equal to or greater than 97%. The greater the value, the better the sphericity. As shown in Table 1, in Examples 1 through 24, all sphericity values are equal to or greater than 97%, resulting in wound-string cores having good sphericity. In Examples 2, 4, 6, and 16, where the sphericity value is very high at 99%, golf balls with excellent sphericity are obtained. In contrast and as shown in Table 2, in Comparison Examples 1–18, the sphericity values are relatively low, e.g., 90–93%, and in all cases less than 95%. The wound-string cores obtained according to these comparison examples have sphericities which cannot be used for a golf ball.

According to the manufacturing apparatus for golf ball of the present invention, wound-string cores having good sphericity can be mass-produced. That is to say, wound-string golf balls having good sphericity can be mass-produced. And, construction of the apparatus is simplified because the rotation frequency of the bottom roller and the frequency of pressurization are constant irrespective of the diameter increase of the wound-string core C in winding.

And, mechanical working is accurate for the simple construction of the reciprocating rotational driving mechanism 4, and working for maintenance is greatly reduced because the apparatus hardly break down. And, the apparatus requires low cost, and production cost of golf ball can be reduced.

And, occurence rate of tension defects is greatly reduced. Concretely, occurence rate of tension defects, conventionally about 30%, is reduced to about 2% in the present invention. Therefore, ununiform hardness of the wound-string core C and disarrangement of winding form are reduced, and quality of the product can be stabilized and enhanced.

Further, when the rubber string G is wound on the core sphere B (solid center) composed of solid rubber, elastic deformation of the core sphere B is prevented for keeping sphericity good, and good winding state can be obtained thereby. In other words, a solid center needless to be frozen can be used.

According to the manufacturing method for golf ball of the present invention, wound-string cores having good sphericity can be mass-produced at low cost. That is to say, wound-string golf balls having good sphericity can be mass-produced at low cost.

And, occurence rate of tension defects is greatly reduced. ununiform hardness of the wound-string core C and disarrangement of winding form are improved, and quality of the product can be enhanced thereby.

While preferred embodiments of the present invention have been described in this specification, it is to be understood that the invention is illustrative and not restrictive, because various changes are possible within the spirit and indispensable features.

What is claimed is:

1. A manufacturing method for a golf ball, which comprises:
   holding a core sphere or a wound-string core in a pair of 34 mm to 42 mm diameter bottom rollers and a pair of concave top rollers having a minimum diameter of 15 mm to 35 mm at a central portion;
   rotating and reciprocating the bottom rollers in an axis direction so as to move opposite to each other to rotate the core sphere or wound-string core;
   winding rubber string; and
   pressurizing the core sphere or wound string core intermittently by the pair of top rollers with predetermined pressure to obtain a wound string core of a predetermined diameter, wherein
   a rotation frequency of the bottom rollers is 1100 rpm to 2000 rpm, a ratio of rotation of the bottom roller to reciprocation of the bottom roller is 10:15 to 15:10, and a ratio of pressurization of the top roller to reciprocation of the bottom roller is 1:14 to 1:5.

2. The method of claim 1, wherein the golf ball has a sphericity of greater than or equal to 95%.

3. The method of claim 1, wherein the golf ball has a sphericity of greater than or equal to 97%.

4. The method of claim 1, wherein a reciprocating rotational driving mechanism reciprocates and rotates the bottom rollers.

5. The method of claim 1, wherein a top roller pressurizing mechanism holds the pair of top rollers as to be rotatable.

6. A manufacturing method for a golf ball, which comprises:

holding a core sphere or a wound-string core in a pair of 34 mm to 42 mm diameter bottom rollers and a pair of concave top rollers having a minimum diameter of 15 mm to 35 mm at a central portion;

rotating and reciprocating the bottom rollers in an axis direction so as to move opposite to each other to rotate the core sphere or wound-string core;

winding rubber string; and pressurizing the core sphere or wound string core intermittently by the pair of top rollers with predetermined pressure to obtain a wound string core of a predetermined diameter, wherein
 a rotation frequency of the bottom rollers is 1100 rpm to 2000 rpm, a ratio of rotation of the bottom roller to reciprocation of the bottom roller is 10:15 to 15:10, and a ratio of pressurization of the top roller to reciprocation of the bottom roller is 1:14 to 1:5;
 a reciprocating rotational driving mechanism reciprocates and rotates the bottom rollers, wherein
  the reciprocating rotational driving mechanism is provided with an input shaft having a pair of cam portions and is driven to rotate around a lateral axis;
  a turning shaft in the lateral axis direction disposed behind the input shaft;
  a pair of ring members, one of the ring members being fitted to one of the pair of cam portions, an other of the ring members being fitted to an other of the pair of cam portions, each of the ring members being fitted to each of the corresponding cam portions so as to freely slide;
  an attachment member attached to a first protruding piece on the turning shaft so as to freely oscillate;
  a connecting member connecting the ring member and the attachment member;
  a bottom roller shaft in the longitudinal axis direction, a front end of which is connected to a bottom roller;
  a holding member holding another end of the bottom roller shaft so as to freely rotate;
  a crank member, a front end of which is attached to the holding member and a rear end of which is attached to a second protruding piece on the turning shaft;
  an output shaft fitted to the bottom roller shaft;
  a plurality of gears transmitting torque from the input shaft to the output shaft;
  a rotational force transmitting mechanism transmitting the torque from the output shaft, allowing the bottom roller to move back and forth; and
  one of the cam portions and the other of the cam portions are directed opposite for 180° each other.

\* \* \* \* \*